United States Patent [19]

McMurray et al.

[11] 4,379,121
[45] Apr. 5, 1983

[54] BRAZING FILLER METAL COMPOSITION AND PROCESS

[75] Inventors: John H. McMurray, Stratford; Jule Miller, Derby, both of Conn.

[73] Assignee: Avco Corporation, Stratford, Conn.

[21] Appl. No.: 281,794

[22] Filed: Jul. 9, 1981

[51] Int. Cl.³ .......................................... C22C 19/05
[52] U.S. Cl. ................................. 420/452; 420/442; 420/459
[58] Field of Search .................. 75/171; 420/442, 452, 420/459

[56] References Cited

U.S. PATENT DOCUMENTS 2,762,706 9/1956 Cape ................................. 75/171 X
3,238,060 3/1966 Quaas et al. ..................... 75/170 X Primary Examiner—L. Dewayne Rutledge
Assistant Examiner—David Hey
Attorney, Agent, or Firm—Ralph D. Gelling

[57] ABSTRACT

Disclosed is a brazing filler metal composition comprising, by weight, about 3.0% to 4.0% chromium, about 1.0%–2.0% boron; about 2.0%–2.5% silicon; about 1.0%–2.0% iron; about 5.0%–6.0% phosphorus; a maximum of about 0.06% carbon and the remainder nickel. Further disclosed is a vacuum brazing process utilizing said filler metal composition.

2 Claims, No Drawings

BRAZING FILLER METAL COMPOSITION AND PROCESS

BACKGROUND OF THE DISCLOSURE

I. Field of the Invention

This invention relates, in general, to brazing filler metals and, more specifically, to filler metal compositions used to form strong joints. In particular, the invention relates to novel filler metals used to form strong joints between parts with gaps substantially greater than heretofore permitted with known filler metals having melting points of about 1,775° F. The invention further relates to a vacuum brazing process utilizing said filler metals.

II. Description of the Prior Art

Brazing consists of joining base metal surfaces by fusing a filler metal, having a lower melting point than the subject base metal, without appreciable fusion of the base metal surfaces themselves. For brazing, a flux may be applied to the subject base metal surfaces either prior to or simultaneously with the filler metal.

A satisfactory brazing flux flows at a temperature somewhat below the melting point of the filler metal; adheres to or wets the base metal surfaces; facilitates the flow and wetting of the filler metal over the subject base metal surfaces generally by reducing the surface tension of the molten filler metal; removes any oxide coating or other adherent foreign matter present on the subject base metal surfaces without appreciably attacking the base metal surfaces; inhibits re-oxidation of the subject base metal surfaces; and is capable of ready displacement by liquid filler metal either leaving no residue or leaving a readily removable, relatively inert residue after completion of the brazing.

Furnace brazing in a vacuum with the use of no flux offers several advantages. For example, the possibility of flux inclusions are eliminated and, accordingly, blind cavities, tortuous paths, and small passageways can be designed into the assembly without regard to flux removal or entrapment after brazing. In addition, fluxless vacuum brazing eliminates the cost of flux and its application, the need for cleaning the assembly after brazing, and potential corrosion of equipment and pollution of air and water by flux residues or flux reaction products.

Nickel-base, copper-base, gold-base, palladium-base, and a few silver-base filler metals are commonly used in vacuum furnace brazing. Apart from compatability with the base metal, filler metals are invariably selected for corrosion resistance in specific media and suitability for service at known operating temperatures.

It has become increasingly important, especially in high temperature aircraft applications, such as, for example, in turbine engine components, to use materials for structural applications that are capable of withstanding high temperatures and corrosive attacks normally associated therewith. Stainless steels and the so-called superalloys, such as nickel-base superalloys, have been employed, of course, where possible to meet requirements of high strength-to-weight ratios, corrosion resistance, etc. at elevated temperatures. The greatest impediment to efficient use of these materials, however, has been the difficulty of obtaining satisfactory joints between parts made of such materials.

The amount of filler metal applied to a joint area must usually be carefully controlled to avoid flowing into areas where it is neither needed nor wanted, as well as to avoid interalloying of base metal and filler metal which is often harmful to joint strength. The brazing alloy should be compatible with the optimum heat treatment temperature of the base metal. Known filler metals for nickel-base alloys also do not usually give good wetting, by limited flow, at brazing temperatures of about 1,775° F. so that joints are sealed without filler material flowing into internal passage of the components. In addition, known filler metals do not have proper wetting and flow characteristics at a brazing temperature of about 1,775° F. while also providing good high temperature corrosion and abrasion resistance. Alloys giving the desired limited flow usually melt at higher temperatures, thus interferring with the base metal.

It is, therefore, an object of this invention to provide a brazing filler metal composition which is devoid of the above-noted disadvantages.

It is another object of this invention to provide a brazing filler metal composition for use in forming strong joints between parts with gaps, substantially greater than those commonly permitted with known nickel-base filler metals.

It is a further object of this invention to provide a brazing filler metal composition which has desired properties for use in forming strong joints between high temperature superalloys, such as those used in turbine engine high temperature components.

It is still another object of this invention to provide brazing filler metals which wet well and yet have very limited flow at a brazing temperature of about 1,775° F.

It is yet another object of this invention to provide brazing filler metals which allow brazing and heat treating in a single cycle with base metals requiring solution treatment at a temperature of about 1,750° F. to obtain optimum strength.

It is another further object of this invention to provide brazing filler metals which provide very good high temperature and corrosion resistance.

It is still another further object of this invention to provide a vacuum brazing process utilizing novel nickel-base filler compositions.

SUMMARY OF THE INVENTION

The foregoing objects and others are accomplished in accordance with this invention, generally speaking, by (a) providing a brazing filler metal composition comprising, by weight, from about 3.0% to about 4.0% chromium; from about 1.0% to about 2.0% boron; from about 2.0% to about 2.5% silicon; from about 1.0% to about 2.0% iron; from about 5.0% to about 6.0% phosphorus; a maximum of about 0.06% carbon; and the remainder nickel and (b) utilizing said filler metal with a nickel-base superalloy in a vacuum brazing process.

DETAILED DESCRIPTION OF THE INVENTION

According to the present invention, any suitable metal may be vacuum-brazed using the novel filler metals described herein. Suitable metals include for example, superalloys such as nickel-base superalloys used in turbine engine components, among others. While any suitable metal may be vacuum-brazed using the filler metal of this invention, particularly good results are obtained with nickel-base superalloys.

While any suitable ratio of materials which comprise the filler metal composition of this invention may be used, excellent wetting, limited flow, and corrosion and abrasion resistance are achieved by providing a composition comprising, by weight, from about 3.0% to about 4.0% chromium; from about 1.0% to about 2.0% boron; from about 2.0% to about 2.5% silicon; from about 1.0% to about 2.0% iron; from about 5.0% to about 6.0;1% phosphorus; a maximum of about 0.06% carbon; and the remainder nickel. This filler metal composition which brazes at a temperature of about 1,775° F. (±10° F.), makes it compatible with the solution heat treat temperature of a nickel base superalloy which is commonly used for turbine engine components. This greatly simplifies processing by allowing brazing and heat treating in a single cycle, while providing optimum mechanical properties for the base material. A preferred filler metal composition comprises, by weight, about 3.5% chromium; about 1.5% boron; about 2.5% silicon; about 1.5% iron; about 5.5% phosphorus; about 0.03% carbon; and the remainder nickel.

Both hot wall retort and cold wall radiant shield furnaces may be used in vacuum brazing. However, because of inherent advantages, cold wall furnaces are by far the more widely used. Cold wall furnaces heat faster and with greater efficiency, and are suitable for use at higher temperatures and vacuum pressures. At higher operating temperatures, the ability of the retort of the hot wall furnace to resist collapse is increasingly dependent on the supporting vacuum surrounding the retort.

The vacuum pumping system should be capable of evacuating a conditioned chamber to a moderate vacuum, such as, for example, about $10^{-3}$ torr, in about 1 hour. The temperature distribution within the work being brazed should be reasonably uniform (i.e., within about ±10° F.).

Depending upon the nature of the base metals to be joined, a very thin layer of nickel may be plated onto the filler metal. When a nickel-base metal contains higher concentrations of aluminum and titanium, for example, it is advantageous to first apply this nickel coating.

A preferred brazing process for use with the filler metal composition of this invention is to (a) heat in a vacuum to about 1,700° F. and hold for about 1 hour; (b) continue heating to about 1,775° F. (the brazing temperature) and hold for about 5 minutes so that the filler metal melts, wets and joins the components; (c) cool to about 1,750° F. and hold for the time required for optimum heat treatment of nickel-base superalloy; and (d) cool to room temperature as required for optimum heat treatment of nickel-base superalloys such as, for example, INCO 718.

The present invention will be further illustrated by the following examples in which parts and percentages are by weight unless otherwise specified.

EXAMPLE I

Components to be joined and made of nickel-base superalloys are cleaned by vapor degreasing with a common solvent (e.g., 1,1,1 trichloroethane). A thin layer of nickel (varying between about 0.0004–0.0008 inch in thickness) is plated onto the areas to be joined. The components are then rinsed thoroughly and bake-dried. The filler metal composition which comprises, by weight, about 3.5% chromium; about 1.5% boron; about 2.5% silicon; about 1.5% iron; about 5.5% phosphorus; about 0.03% carbon and the remainder nickel is then applied. (The filler metal is mixed in slurry with a nitrocellulose binder and is applied to the areas to be joined. The components are then heated to about 1,700° F. and held for about one hour. Heating is then continued to about 1,775° F. (the brazing temperature) and held for about 5 minutes. The temperature is then reduced to about 1,750° F. and held for about 2 hours. After backfilling the chamber with chemically inert gas, the component is removed at about 400° F. and is air cooled. The clean dry brazed component is ready for use or further processing as soon as it is cool. Excellent brazing results (i.e., very strong joints) are achieved.

EXAMPLE II

Example I is repeated with a filler metal composition comprising, by weight, about 3.0% chromium; about 1.0% boron; about 2.0% silicon; about 1.0% iron; about 5.0% phosphorus; about 0.01% carbon and the remainder nickel. Excellent brazing results (i.e., very strong joints) are achieved.

Example III

Example I is repeated with a filler metal composition comprising, by weight, about 4.0% chromium, about 2.0% boron; about 2.5% silicon; about 2.0% iron; about 6.0% phosphorus; about 0.06% carbon and the remainder nickel. Very good results (i.e., strong joints) were achieved.

While specific components of the present system are defined in the working examples above, any of the other typical materials indicated above may be substituted in the workin examples, if appropriate. In addition, many other variables may be introduced into the brazing process, such as further pruification steps, etc. which may in any way affect, enhance, or otherwise improve the present process.

While various specifics are given in the present application, many modifications and ramifications will occur to those skilled in the art upon a reading of the present disclosure. They are intended to be covered herein.

What is claimed is:

1. A brazing filler metal composition comprising, by weight, from about 3.0% to about 4.0% chromium; from about 1.0% to about 2.0% boron; from about 2.0% to about 2.5% silicon; from about 1.0% to about 2.0% iron; from about 5.0% to about 6.0% phosphorus; a maximum of about 0.06% carbon; and the remainder nickel.

2. The brazing filler metal composition of claim 1 comprising about 3.5% chromium; about 1.5% boron; about 2.5% silicon; about 1.5% iron; about 5.5% phosphorus; about 0.03% carbon; and the remainder nickel.

* * * * *

UNITED STATES PATENT AND TRADEMARK OFFICE
CERTIFICATE OF CORRECTION

PATENT NO. : 4,379,121
DATED : April 5, 1983
INVENTOR(S) : John H. McMurray and Jule Miller It is certified that error appears in the above-identified patent and that said Letters Patent are hereby corrected as shown below:

Column 3, line 5, please delete ";1" after "6.0".

Signed and Sealed this

Fourteenth Day of June 1983

[SEAL]

Attest:

DONALD J. QUIGG

Attesting Officer

Acting Commissioner of Patents and Trademarks